(12) United States Patent
Xu et al.

(10) Patent No.: US 9,787,050 B2
(45) Date of Patent: Oct. 10, 2017

(54) TUNABLE NARROW-LINEWIDTH SINGLE-FREQUENCY LINEAR-POLARIZATION LASER DEVICE

(71) Applicant: South China University of Technology, Guangzhou (CN)

(72) Inventors: Shanhui Xu, Guangzhou (CN);
Changsheng Yang, Guangzhou (CN);
Zhongmin Yang, Guangzhou (CN);
Zhouming Feng, Guangzhou (CN);
Qinyuan Zhang, Guangzhou (CN);
Zhonghong Jiang, Guangzhou (CN)

(73) Assignee: South China University of Technology (CN)

( * ) Notice: Subject to any disclaimer, the term of this patent is extended or adjusted under 35 U.S.C. 154(b) by 0 days.

(21) Appl. No.: 15/035,605

(22) PCT Filed: Dec. 4, 2014

(86) PCT No.: PCT/CN2014/092987
§ 371 (c)(1),
(2) Date: May 10, 2016

(87) PCT Pub. No.: WO2015/106606
PCT Pub. Date: Jul. 23, 2015

(65) Prior Publication Data
US 2016/0261085 A1  Sep. 8, 2016

(30) Foreign Application Priority Data
Jan. 17, 2014  (CN) .......................... 2014 1 0023920

(51) Int. Cl.
*H01S 3/137*  (2006.01)
*H01S 3/1055*  (2006.01)
(Continued)

(52) U.S. Cl.
CPC .......... *H01S 3/1055* (2013.01); *H01S 3/0405* (2013.01); *H01S 3/0675* (2013.01);
(Continued)

(58) Field of Classification Search
CPC .. H01S 3/0401; H01S 3/0675; H01S 3/06712; H01S 3/08027; H01S 3/1055; H01S 3/1062
See application file for complete search history.

(56) References Cited

U.S. PATENT DOCUMENTS 7,903,696 B2   3/2011  Klebanov
2004/0196874 A1*  10/2004  Spiegelberg ........ H01S 3/06716
                                                          372/6
2009/0074014 A1   3/2009  Liu

FOREIGN PATENT DOCUMENTS

CN       101420099 A  *  4/2009
CN       202183551 U      4/2012
(Continued)

OTHER PUBLICATIONS

International Search Report for Application No. PCT/CN2014/092987 dated Mar. 10, 2015.
(Continued)

*Primary Examiner* — Tod T Van Roy
(74) *Attorney, Agent, or Firm* — Lerner, David, Littenberg, Krumholz & Mentlik, LLP

(57) ABSTRACT

A tunable narrow-linewidth single-frequency linear-polarization laser device comprising a heat sink, a pumping source packaged on the heat sink, a first and second collimating lenses, a laser back cavity mirror, a thermal optical tunable filter, a rare-earth-ion heavily-doped multicomponent glass optical fiber, a super-structure polarization-maintaining fiber grating, a polarization-maintaining optical isolator, a polarization-maintaining optical fiber, and a thermoelectric refrigerating machine. The laser device uses
(Continued)

a short and straight single-frequency resonant cavity structure, the heavily-doped and high-gain characteristics of the multicomponent glass optical fiber, a frequency selection role and wavelength tuning function of the thermal optical tunable filter and the superstructure polarization-maintaining fiber grating, and combines a precision temperature adjustment technology, and by means of real-time adjustment of distribution of reflection wavelengths and transmission wavelengths, the laser device changes spectrum peak overlapping positions, so as to implement stable output of wide-tuning-range, extra-narrow-linewidth, high-extinction-ratio and high-output-power continuously tunable single-frequency linear-polarization laser.

10 Claims, 2 Drawing Sheets

(51) Int. Cl.
| | | |
|---|---|---|
| H01S 3/139 | (2006.01) | |
| H01S 3/106 | (2006.01) | |
| H01S 3/094 | (2006.01) | |
| H01S 3/102 | (2006.01) | |
| H01S 3/067 | (2006.01) | |
| H01S 3/08 | (2006.01) | |
| H01S 3/16 | (2006.01) | |
| H01S 3/17 | (2006.01) | |
| H01S 3/00 | (2006.01) | |
| H01S 3/04 | (2006.01) | |

(52) U.S. Cl.
CPC ...... *H01S 3/06712* (2013.01); *H01S 3/06716* (2013.01); *H01S 3/094042* (2013.01); *H01S 3/1028* (2013.01); *H01S 3/1062* (2013.01); *H01S 3/137* (2013.01); *H01S 3/139* (2013.01); *H01S 3/1603* (2013.01); H01S 3/0064 (2013.01); H01S 3/0401 (2013.01); H01S 3/06708 (2013.01); H01S 3/08027 (2013.01); H01S 3/1618 (2013.01); H01S 3/175 (2013.01)

(56) References Cited

FOREIGN PATENT DOCUMENTS

| | | |
|---|---|---|
| CN | 103457142 A | 12/2013 |
| CN | 103956638 A | 7/2014 |
| JP | 2012209510 A | 10/2012 |

OTHER PUBLICATIONS

Spiegelberg et al., "Low-Noise narrow-linewidth fiber laser at 1550 nm (Jun. 2003)", Journal of Lightwave Technology, vol. 22, No. 1, Jan. 2004, pp. 57-62.

Feng et al., "A Compact linearly polarized low-rise single-frequency fiber laser at 1064 nm", Applied Physics Express 6 (2013) 052701.

* cited by examiner

TUNABLE NARROW-LINEWIDTH SINGLE-FREQUENCY LINEAR-POLARIZATION LASER DEVICE

CROSS REFERENCE TO RELATED APPLICATIONS

The present application is a national phase entry under 35 U.S.C. §371 of International Application No. PCT/CN2014/092987, filed Dec. 4, 2014, which claims priority from Chinese Patent Application No. 201410023920.5 filed Jan. 17, 2014, all of which are hereby incorporated herein by reference.

TECHNICAL FIELD

The invention relates to a laser device optical source used in the technical fields of optical fiber remote sensing, coherent optical spectrum beam, gravity waves detection, laser radiator and non-linear frequency transition, and more specifically, relates to a tunable narrow-linewidth single-frequency linear-polarization laser device.

BACKGROUND

Narrow-linewidth single-frequency optical fiber laser devices is an important branch of the development of laser devices, which have extremely narrow linewidth, low noise, and excellent coherence characteristics. Its optical spectrum linewidth is extremely narrow (which can be up to 10-8 nm), which is narrower than the linewidth of the currently best narrow linewidth DFB laser device by two orders of magnitude, and is narrower than the linewidth of the DWDM signal light source in current optical communication networks by 5-6 orders of magnitude. It is especially important because it shows substantive potential values to be applied to the technical fields of coherence optical spectrum beam, laser radiators and non-frequency transitions. In these technical fields, it is generally required that the optical spectrum linewidth of the laser device being extremely narrow and linear-polarization functioning and being tunable (operation in multi-channel or multi-wavelength). These parameters determine and affect the resolution, transition efficiency, costs of the applied situations. Therefore, there is a need for development of a simple and reliable tunable narrow-linewidth single-frequency linear-polarization laser device.

According to the recent research, it is reported that a tunable single-frequency laser device generally uses rare-earth-ion doped with quartz optical fiber or rare-earth-ion doped with solid crystal as the operating medium for the single-frequency laser. It inserts optical modulated crystal blocks with low reliability (such as electro-optical crystal, thermo-optic crystal, F—P etalons, etc.) in the optical path to maintain the single frequency operating or adjust the laser frequency. However, there are a series of problems, such as that the concentration of the doped rare-earth-ions cannot be further increased, the resonant cavity is too long, prone to mode hopping, has poor reliability, and a maximum output tunable single-frequency laser of tens mW magnitude. The biggest difficulty is that it is hard for the linewidth to be under 10 kHz, which leads to heavy noise.

Using rare-earth-ions heavily-doped multicomponent glass optical fiber as the gain medium of the laser, in conjunction with a short and straight single-frequency resonant cavity is able to effectively implement a single-frequency laser output with an output power more than 100 mW and a linewidth less than 2 kHz. Research related to this comprises a report on the erbium-ytterbium co-doped phosphate glass optical fiber with a length of 2 cm by C. Spiegelbert et al. which achieves a single-frequency optical fiber light output with an output power more than 200 mW and a linewidth less than 2 kHz and a wavelength of 1.5 μm [J. Lightwave Technol., 2004, 22: 57]; a report on the ytterbium-doped phosphate glass optical fiber with a length of 0.8 cm by Z. Feng et al. which achieves a single-frequency linear-polarization optical fiber laser output with an output power more than 20 mW, a linewidth less than 2 kHz, an extinction ratio more than 30 dB and a wavelength of 1.06 μm [Appl. Phys. Express, 2013, 6:052701]. In addition, a patent application of a high power narrow linewidth single-frequency laser system by The University of Alexandria and NP Photon etc. Inc. (Publication Number: U.S. Pat. No. 7,903,696 B2) utilizes two super short single-frequency resonant cavity output low power narrow linewidth single-frequency laser signals, the laser power of which being respectively amplified by an ordinary EDFA and a high power double-clad fiber amplifier. However, the optical fiber laser device required does not possess linear-polarization output with tunable wavelengths.

SUMMARY OF THE INVENTION

The object of the invention is to overcome the above disadvantages of the prior art and to provide a tunable narrow linewidth single-frequency linear-polarization laser device, which is able to continuously and selectively tune the laser output wavelength so that it can cover a broad tunable wavelength range. The present laser device uses a short and straight single-frequency resonant cavity structure, utilizes heavy dope and high gain of the multicomponent glass optical fiber, and utilizes the frequency selection function and the wavelength tuning function of the thermoelectric tunable filter and the superstructure polarization-maintaining optical fiber grating, in combination with precise temperature control technology (a thermoelectric cooler TEC) to effectively achieve a stable output of single-frequency linear-polarization laser with a broad tunable range, linewidth of kHz magnitude and high extinction ratio under the precondition that a pumping source is providing pumping energy.

The object of the invention can be realized by the following technical solution.

A tunable narrow-linewidth single-frequency linear-polarization laser device, comprising: a heat sink, a pumping source packaged on the heat sink, a first collimating lens, a laser back cavity mirror, a thermal optical tunable filter, a second collimating lens, a rare-earth-ion heavily-doped multicomponent glass optical fiber, a super-structure polarization-maintaining fiber gratin, a polarization-maintaining optical isolator, a polarization-maintaining optical fiber, and a thermoelectric cooler TEC; wherein the pumping source, the first collimating lens, the laser back cavity mirror, the thermal optical tunable fiber, the second collimating lens, the rare-earth-ion heavily-doped multicomponent glass optical fiber, the super-structure polarization-maintaining fiber grating, the polarization-maintaining optical isolator, the polarization-maintaining optical fiber being arranged in sequence, and the pumping source, the thermal optical tunable filter and the super-structure polarization-maintaining fiber grating each being arranged on a thermoelectric cooler TEC.

Further, the output of the pumping source is coupled with the laser back cavity mirror via the first collimating lens, the laser back cavity mirror is coupled with the thermal optical tunable filter, the thermal optical tunable filter is coupled with the second collimating lens, the second collimating lens is coupled with the input of the rare-earth-ion heavily-doped multicomponent glass optical fiber, the output of the rare-earth-ion heavily-doped multicomponent glass optical fiber is coupled with the input of the super-structure polarization-maintaining fiber grating, the output of the super-structure polarization-maintaining fiber grating is coupled with the input of the polarization-maintaining optical fiber, the output of the polarization-maintaining optical fiber is coupled with the tail fiber of the polarization-maintaining optical fiber.

Further, the laser back cavity mirror is coated with thin membrane layer on its mirror terminal surface. The thin membrane layer highly reflects the laser signal wavelengths with a reflection ratio of over 80% and highly transmits the pumping source wavelengths with a transmission ratio of over 80%.

Further, the thermal optical tunable filter is an F—P type membrane tunable filter. the thermoelectric cooler TEC performs precise temperature control and the thermal optical characteristics and the high refraction ratio of the intermediate membrane material of the filter are used, such that the refraction ratio of the intermediate membrane material of the filter are varied to implement the tunability of the transmission wavelengths.

Further, the fiber core component of the rare-earth-ion heavily-doped multicomponent glass optical fiber (8) being phosphate glass components, which is $65P_2O_5$-$10Al_2O_3$-$20BaO$-$3La_2O_3$-$2Nd_2O_3$. Its basic material includes but not limited to multicomponent glass such as phosphate glass, silicate glass, PWG.

Further, the fiber core of the rare-earth-ion heavily-doped multicomponent glass optical fiber is evenly doped with high concentration of rare earth luminescence ions. The doping concentration of the rare earth luminescence ions is more than $1 \times 10^{20}$ ions/cm$^3$. The rare earth luminescence ions includes one or more of lanthanide ions, alkaline earth metal ions, transition metal ions or their combinations.

Further, the shape of the fiber core of the rare-earth-ion heavily-doped multicomponent glass optical fiber is circular with a fiber core diameter of 3~50 μm. The shape of the wrapping layer is a circular, D-shaped, hexagon, or octagon, wherein the diameter of the circular wrapping layer or the side-to-side distance of the non-circular wrapping layer is 80~900 μm.

Further, one end of the rare-earth-ion heavily-doped multicomponent glass optical fiber is coated with a multi-layer antireflection coating, wherein the multi-layer antireflection coating highly transmits the laser signal wavelengths with a transmission ratio of more than 90% to suppress the reflection of the fiber terminal surface.

Further, the super-structure polarization-maintaining fiber grating selectively comb reflects the laser signal wavelengths which is partial transmission with a reflection ratio of the center wavelength being 20%~80%, having a good characteristic of uniformity of the reflection peaks and a narrow bandwidth as a coupling component for laser output.

Further, the pumping source is a semiconductor laser device with an edge emitting structure or other form of package. The output mode of the pumping source (1) is either single-mode or multi-mode. The outputting parameters of the pumping wavelength are 800' 1200 nm and the outputting pumping source is more than 50 mW. The pumping mode of the pumping source is forward pumping, that is, the pumping light emitted from the pumping source couples directly through the collimating lens into the optical path.

Further, the temperature of the thermal optical tunable filter and the super-structure polarization-maintaining fiber grating are precisely controlled by independent thermoelectric cooler TEC, constituting the laser device wavelength/frequency tenability function section. The precise temperature control causes the refraction ratio of the fiber grating and the filter vary accordingly such that the coupling overlapping positions of the gate reflection spectrum of the super-structure polarization-maintaining fiber grating and the transmission spectrum of the thermal optical tunable filter continuously vary to achieve an optical fiber frequency selection with the most feedback gain at different wavelengths, that is, to implement wide-tuning-range continuously tunable output wavelengths of the single-frequency linear-polarization laser device.

The above super-structure polarization-maintaining optical fiber grating carves the gate on the polarization-maintaining grating by utilizing the photo-sensitivity of the optical fiber material, and is cascaded by multiple segments of polarization-maintaining optical fiber grating with same parameters spaced apart by the same distance. The super-structure polarization-maintaining optical fiber grating selectively comb reflects (i.e., partial transmission) the laser signal wavelengths with a requirement for the center wavelength reflection ratio of 20~80%. The temperatures of the super-structure polarization-maintaining optical fiber gratings are precisely controlled by independent TEC chips such that the refraction ratio can vary. As such, the coupling overlapping of the optical spectrum of the reflection grating and the transmission optical spectrum of the thermal optical tunable filter can be tunable to achieve the frequency selection, feedback and laser output of single-frequency laser with a single wavelength.

The optical element and the optical file are collimating coupled through space directly, or polish corresponding optical fiber terminal surfaces for mechanical interface, or fusing machine for fusion couple.

After the above single-frequency linear-polarization laser goes through the polarization-maintaining optical isolator and the polarization-maintaining optical fiber after its output, wherein the polarization-maintaining optical isolator is used to guarantee positive feedback of the optical path and to suppress negative optical reflection of the terminal surface to improve the stability of the laser output power.

The above optical path and the optical elements are packaged on a metal heat sink for effective heat dissipation, which avoids the heat accumulation problem of the laser device and guarantees the stability and reliability of its output power and the laser operating wavelength.

The present invention has the following technical effects and advantages against the prior art: the structure of the present invention is simple and easy to realize. The laser device in the present invention uses rare-earth-ion heavily doped multi-components glass optical fiber (centimeter magnitude) as the gain medium of the laser and a short and straight linear-polarization resonant cavity structure. The resonant cavity of the single-frequency linear-polarization laser device is primarily composed of the thermal optical tunable filter, the multi-component glass optical fiber and the super-structure polarization-maintaining optical fiber grating.

Firstly, the pumping source pumps the laser device resonant cavity, and the rare-earth luminescence ion in the multi-component glass optical fiber core experiences inversion of population ratio to produce stimulated radiation signal light. Secondly, a temperature control module, i.e., a thermoelectric cooler (TEC chip) controls the temperature of the thermal optical tunable filter to control and tune the comb shaped transmission peaks distribution generated by the filter (changing the transmitted wavelength). Again, the temperature of the super-structure polarization-maintaining optical fiber grating to change the comb shaped reflection peaks wavelengths distribution of the reflection grating so as to selectively overlap the maximum reflection peak and the maximum transmission peak of the thermal optical tunable filter at a certain position of a particular wavelength, thereby forming a maximum laser feedback gain. As such, under the effective feedback of the front and back cavity mirror, the signal light experiences multiple vibrations back and forth and is amplified by multiple times.

Since the cavity length of the laser device resonant cavity is of centimeter magnitude, the distance between neighboring vertical membrane in the cavity can be GHz. When the optical spectrum of the overlapping wavelength of the thermal optical tunable filter and the super-structure polarization-maintaining optical fiber grating is narrow to such an extent that there is only one vertical membrane frequency in the gain curve range of the operating medium, i.e., realizing stable output of single-frequency linear-polarization laser. If the pumping source power is further increased, the laser linewidth will be further narrowed, and finally realize a stable output of narrow linewidth single-frequency linear-polarization laser with kHz magnitude.

In the above tuning process, the thermoelectric cooler precisely controls the temperature and adjusts the temperature distribution, which is able to continuously change the comb shaped maximum reflection spectrum peak distribution of the super-structure polarization-maintaining optical fiber grating and the comb shaped maximum transmission spectrum peak distribution of the thermal optical tunable filter, making these two wavelength distributions overlap at another wavelength position to achieve maximum feedback effect at different wavelengths. That is, the output wavelength of the single-frequency linear-polarization laser can be changed in real-time, continuously and selectively so as to achieve stable output of tunable single-frequency linear-polarization laser with a broad tunable range, linewidth of kHz magnitude and high extinction ratio.

Figure 1:
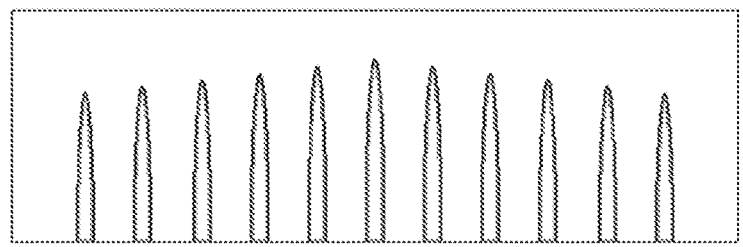
FIG. 1 is a schematic diagram of a typical comb shaped reflection spectrum of a super-structure polarization-maintaining optical fiber grating.

In the drawings, 1—the pumping source, 2—the first thermoelectric cooler TEC, 3—the first collimating lens, 4—the laser back cavity mirror, 5—the thermal optical tunable filter, 6—the second thermoelectric cooler TEC, 7—the second collimating lens, 8—erbium-ytterbium co-doped phosphate glass optical fiber, 9—the super-structure polarization-maintaining optical fiber grating, 10—the third thermoelectric cooler TEC, 11—the polarization-maintaining laser isolator, 12—the polarization-maintaining optical fiber, 13—the heat sink.

DETAILED DESCRIPTION OF THE INVENTION

Further explanations of the invention are provided below in connection with detailed embodiments and figures. However, the present invention is not limited to the embodiments.

As illustrated in FIG. 1, it shows a schematic diagram of the typical comb shape reflection spectrum peaks of the super-structure polarization-maintaining optical fiber grating. The reflection peaks have narrow spacing, are evenly distributed and have high reflection ratio.

Figure 2:
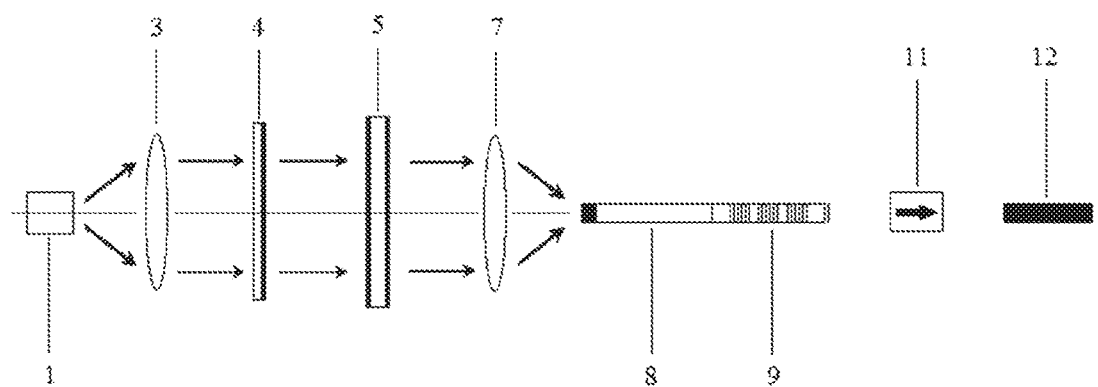
FIG. 2 is a principle diagram of the tunable narrow linewidth single-frequency linear-polarization laser device according to embodiments of the invention, wherein the laser back cavity mirror is coated with mirror coating, the laser front cavity mirror employs the super-structure polarization-maintaining optical fiber grating and the pumping is a forward pumping.

As illustrated in FIG. 2, in the tunable narrow linewidth single-frequency linear-polarization laser device according to the embodiment, the pumping source 1, the first collimating lens 3, the laser back cavity mirror 4, the thermal optical tunable filter 5, the second collimating lens 7, the rare-earth-ion heavily doped multi-component glass optical fiber 8, the super-structure polarization-maintaining optical fiber grating 9, the polarization-maintaining optical isolator 11, the polarization-maintaining optical fiber 12 are arranged from left to right, with the pumping source 1, the thermal optical tunable filter 5 and the super-structure polarization-maintaining optical fiber grating 9 each being arranged on a thermoelectric cooler TEC. The above entire optical path and all the optical elements are fixedly packaged in a heat sink of metal material for heat dissipation.

The single-frequency laser resonant cavity according to the present invention is composed of the back cavity mirror, the thermal optical tunable filter, the collimating lens and the super-structure polarization-maintaining optical fiber grating, wherein the super-structure polarization-maintaining optical fiber grating functions as the front cavity mirror. Using the pumping source for the single-frequency laser resonant cavity requires the collimating lens to align the optical beam and then couple with the back cavity mirror with low loss due to the pumping laser output by the pumping source diverges.

The thermal optical tunable filter according to the embodiment is an F—P type membrane filter. The layer number and optical thickness parameters of the membrane can be designed according to the desired comb shape transmission peaks wavelengths. The temperature of the thermal optical tunable filter 5 is precisely controlled by an independent second thermoelectric cooler TEC6. Control and adjustment of the temperature causes thermo-optic effect, such that the refraction ratio of its multi-layer membrane material changes so as to achieve the tenability of comb shape transmission wavelengths.

The rare-earth-ion heavily doped multi-component glass optical fiber is used as the gain medium for the laser, generally with a length of 0.5-50 cm. The specific length can be selected in this range in accordance with the laser output power and the requirement for linewidth. The fiber core of the multi-component glass optical fiber is heavily doped concentration of rare-earth luminescence ions (combinations of one or more of lanthanide ions, alkaline earth metal ions, transition metal ions), wherein the doping concentration of the rare-earth luminescence ions is required to be more than $1 \times 10^{20}$ ions/cm. The shape of the fiber core of the rare-earth-ion heavily-doped multicomponent glass optical fiber is circle with a fiber core diameter of 3~50 μm. The shape of the wrapping layer is a circular, D-shapes, hexagon, or octagon, etc., wherein the diameter or the side-to-side distance of the wrapping layer is 80~900 μm. One end of the rare-earth-ion heavily-doped multicomponent glass optical fiber is coated with a multi-layer antireflection coating, wherein the membrane coating highly transmits the laser signal wavelengths with a transmission ratio of more than 90% to suppress the reflection of the fiber terminal surface.

In the embodiment, the output wavelength of the pumping source 1 is 980 nm, and the pumping power is 750 mW. The temperature of the thermal optical tunable filter 5 can be precisely controlled and its thermo-optic effect is able to tune its comb shape maximum transmission peaks distribution. The mirror terminal surface of the laser back cavity mirror 4 is coated with membrane and the membrane coating has a reflection ratio of laser signal wavelength of 99% and a transmission ratio of the pumping optical wavelength of 99%. Laser gain function is achieved by the combination of the erbium-ytterbium co-doped phosphate glass optical fiber 8 and the super-structure polarization-maintaining optical fiber grating 9. When the transmitted light traverses the collimating lens 7 and collimates coupling into the erbium-ytterbium co-doped phosphate glass optical fiber 8 and one terminal surface of the erbium-ytterbium co-doped phosphate glass optical fiber 8 is coated with a multi-layer antireflection membrane. The other terminal of the erbium-ytterbium co-doped phosphate glass optical fiber 8 is fused with the super-structure polarization-maintaining optical fiber grating 9. The temperature of the super-structure polarization-maintaining optical fiber grating 9 can be precisely controlled by a third thermoelectric cooler TEC10 to tune its comb shape maximum reflection peaks distribution, such that it overlaps with the maximum transmission peaks of the thermal optical tunable filter 5 at a certain wavelength to form laser wavelength feedback and eventually the laser traverse the polarization-maintaining optical isolator 11 and the tail fiber of the polarization-maintaining optical fiber 12 for stable output.

The erbium-ytterbium co-doped phosphate glass optical fiber 8 is used as the gain medium for the laser with a length of 1.5 cm in this embodiment. The primary constituting component of its fiber core is phosphate glass components (which is composed of $65P_2O_5\text{-}10Al_2O_3\text{-}20BaO\text{-}3La_2O_3\text{-}2Nd_2O_3$). The fiber core is evenly doped with high concentration of rare-earth luminescence erbium ions and ytterbium ions, wherein the doping concentration are $2.5\times10^{20}$ ions/$cm^3$ and $5.0\times10^{20}$ ions/$cm^3$ respectively, the core diameter is 6 μm and the wrapping layer diameter is 125 μm and the shape are both circular. One terminal of the erbium-ytterbium co-doped phosphate glass optical fiber 8 is coated with a multi-layer antireflection membrane and the membrane coating has a transmission ratio of the laser signal wavelength of 99.9%. The center reflection wavelength of the super-structure polarization-maintaining optical fiber grating 9 is located in the gain spectrum of the laser gain medium with a reflection ratio of 70%.

The pumping style is forward pumping. The pumping source 1 injects the pumping light into the fiber core of the erbium-ytterbium co-doped phosphate glass optical fiber 8 to inverse the particle number of the rare-earth luminescence ions and to produce stimulated radiated laser signal which transmits through the two terminals of the optical path. On the one hand, the light exits through the collimating lens 7 from the left terminal of the erbium-ytterbium co-doped phosphate glass optical fiber 8, transmits through the thermal optical tunable filter 5 to form comb shape transmission peaks wavelengths distribution and then returns along the same path by the laser back cavity mirror 4 and collimates coupling into the fiber core of the erbium-ytterbium co-doped phosphate glass optical fiber 8 to form optical feedback. On the other hand, the light, from the right terminal of the erbium-ytterbium co-doped phosphate glass optical fiber 8, exits through the super-structure polarization-maintaining optical fiber grating 9 and reflects back and renders comb shape reflection peaks wavelengths distribution and to overlap with the transmission spectrum of the thermal optical tunable filter to produce coherent phase length and continuous optical feedback. In the course of tuning, the temperature is precisely controlled to continuously change the reflection peaks wavelengths distribution of the super-structure polarization-maintaining optical fiber grating and the transmission peaks wavelengths distribution of the thermal optical tunable filter, such that the comb shape maximum reflection peaks and the maximum transmission peaks overlap at another wavelength. That is, the wavelength overlapping position can continuously change to achieve a maximum feedback and laser stimulation radiation at different wavelengths, i.e., real-time and continuous output wavelength of varying laser. The reflection spectrum and center wavelengths of the super-structure polarization-maintaining optical fiber grating is precisely controlled, such that when the spectrums of the thermal optical tunable filter and the super-structure optical fiber grating are narrow to a certain extent and the cavity length of the whole laser resonant cavity is controlled under a certain length, it can be ensured that there is only one vertical membrane operating in the laser cavity and there is no mode hopping and mode contention. When the laser traverses multiple times and is amplified by multiple times under the function of laser feedback, before the laser power saturation is reached, the linewidth of the single-frequency laser will be increasingly narrow with the pumping power being increasingly enhanced, and will eventually achieve tunable narrow linewidth single-frequency linear-polarization laser output with a laser linewidth less than 10 kHz, an extinction ratio more than 25 dB and an output power more than 100 mW. The temperature of the pumping source is controlled by an independent first thermoelectric cooler TEC2 to ensure the stability of its output wavelength and the pumping power.

Figure 3:
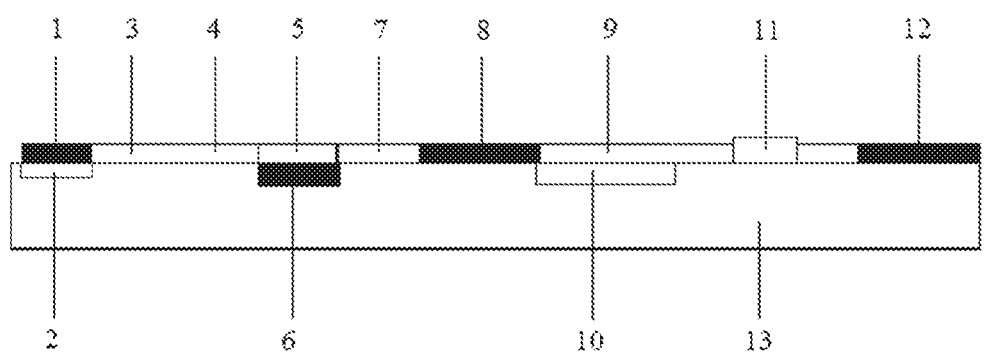
FIG. 3 is a schematic diagram of the TEC temperature control and packaging according to embodiments of the invention.

As illustrated in FIG. 3, it is a schematic diagram of the TEC temperature control manner and package according to the embodiments. Pumping source 1 is positioned on a first thermoelectric cooler TEC2 for precise temperature control and to ensure the stability of the operating center wavelength and the output power of the pumping laser. The thermal optical tunable filter 5 is positioned on a second thermoelectric cooler TEC6 for precise temperature control. The super-structure polarization-maintaining optical fiber grating 9 is positioned on a third thermoelectric cooler TEC10 for precise temperature control. All the above described optical paths and the optical elements are fixedly packaged on a metal heat sink 13 for effective heat dissipation and to ensure the stability and reliability of the output power and the output wavelength of the single-frequency linear-polarization laser.

What is claimed:

1. A tunable narrow-linewidth single-frequency linear-polarization laser device, characterized in that, comprising: a heat sink, a pumping source packaged on the heat sink, a first collimating lens, a laser back cavity mirror, a thermal optical tunable filter, a second collimating lens, a rare-earth-ion heavily-doped multicomponent glass optical fiber, a super-structure polarization-maintaining fiber grating, a polarization-maintaining optical isolator, a polarization-maintaining optical fiber, and a plurality of thermoelectric coolers (TECs); wherein the pumping source, the first collimating lens, the laser back cavity mirror, the thermal optical tunable fiber, the second collimating lens, the rare-earth-ion heavily-doped multicomponent glass optical fiber, the super-structure polarization-maintaining fiber grating, the polarization-maintaining optical isolator, the polarization-maintaining optical fiber being arranged in the listed order, and the pumping source, the thermal optical tunable filter and the super-structure polarization-maintaining fiber grating each being arranged on a respective thermoelectric cooler TEC).

2. The tunable narrow-linewidth single-frequency linear-polarization laser device according to claim 1, wherein the output of the pumping source being coupled with the laser back cavity mirror via the first collimating lens, the laser back cavity mirror being coupled with the thermal optical tunable filter, the thermal optical tunable filter being coupled with the second collimating lens, the second collimating lens being coupled with the input of the rare-earth-ion heavily-doped multicomponent glass optical fiber, the output of the rare-earth-ion heavily-doped multicomponent glass optical fiber being coupled with the input of the super-structure polarization-maintaining fiber grating, the output of the super-structure polarization-maintaining fiber grating being coupled with the input of the polarization-maintaining optical fiber, the output of the polarization-maintaining optical fiber being coupled with a tail end of the polarization-maintaining optical fiber.

3. The tunable narrow-linewidth single-frequency linear-polarization laser device according to claim 1, wherein the laser back cavity mirror being coated with a thin membrane layer on its mirror terminal surface, the thin membrane layer highly reflecting the laser signal wavelengths more than 80% and highly transmitting the pumping source wavelengths more than 80%.

4. The tunable narrow-linewidth single-frequency linear-polarization laser device according to claim 1, wherein the thermal optical tunable filter being a Fabry-Perot type membrane tunable filter; the filter's respective thermoelectric cooler (TEC) performing precise temperature control and the thermal optical characteristics and the high refraction ratio of an intermediate membrane material of the filter being used, such that the B refraction ratio of the intermediate membrane material of the filter being varied to tune the output wavelength.

5. The tunable narrow-linewidth single-frequency linear-polarization laser device according to claim 1, wherein a fiber core component of the rare-earth-ion heavily-doped multicomponent glass optical fiber being $65P_2O_5$-$10Al_2O_3$-$20BaO$-$3La_2O_3$-$2Nd_2O_3$; the fiber core of the rare-earth-ion heavily-doped multicomponent glass optical fiber are evenly doped with high concentration of rare earth luminescence ions, the doping concentration of the rare earth luminescence ions being more than $1\times10^{20}$ ions/cm$^3$; the rare earth luminescence ions including one or more of lanthanide ions, alkaline earth metal ions, transition metal ions or their combinations.

6. The tunable narrow-linewidth single-frequency linear-polarization laser device according to claim 1, wherein the shape of a fiber core of the rare-earth-ion heavily-doped multicomponent glass optical fiber being circular with a fiber core diameter of 3~50 μm; the shape of a wrapping layer being circular, D-shaped, hexagon, or octagon, wherein the diameter of the circular wrapping layer or the side-to-side distance of the non-circular wrapping layer being 80~900 μm.

7. The tunable narrow-linewidth single-frequency linear-polarization laser device according to claim 1, wherein one end of the rare-earth-ion heavily-doped multicomponent glass optical fiber being coated with a multi-layer antireflection coating, wherein the multi-layer antireflection coating highly transmitting the laser signal wavelengths with a transmission ratio of more than 90% to suppress the reflection of the fiber terminal surface.

8. The tunable narrow-linewidth single-frequency linear-polarization laser device according to claim 1, wherein the super-structure polarization-maintaining fiber grating selectively comb reflecting the laser signal wavelengths which is partial transmission with a reflection ratio of the center wavelength being 20%~80%, having a characteristic of uniformity of the reflection peaks and a narrow bandwidth as a coupling component for laser output.

9. The tunable narrow-linewidth single-frequency linear-polarization laser device according to claim 1, wherein the pumping source being a semiconductor laser device with an edge emitting structure or other form of package; wherein the output mode of the pumping source being either single-mode or multi-mode, the outputting parameters of the pumping wavelength being 800~1200 nm and the outputting pumping source being more than 50 mW; the pumping mode of the pumping source being forward pumping, that is, the pumping light emitted from the pumping source coupling directly through the collimating lens into the optical path.

10. The tunable narrow-linewidth single-frequency linear-polarization laser device according to claim 1, wherein the temperature of the thermal optical tunable filter and the super-structure polarization-maintaining fiber grating being precisely controlled by independent thermoelectric coolers (TECs), constituting a section having the laser device wavelength/frequency tenability function; the precise temperature control causing the refraction ratio of the fiber grating and the filter vary accordingly such that the coupling overlapping positions of the reflection spectrum of the super-structure polarization-maintaining fiber grating and the transmission spectrum of the thermal optical tunable filter continuously varying to achieve an optical fiber frequency selection at different wavelengths, that is, to implement wide-tuning-range continuously tunable output wavelengths of the single-frequency linear-polarization laser device.

\* \* \* \* \*